United States Patent Office 2,772,875
Patented Dec. 4, 1956

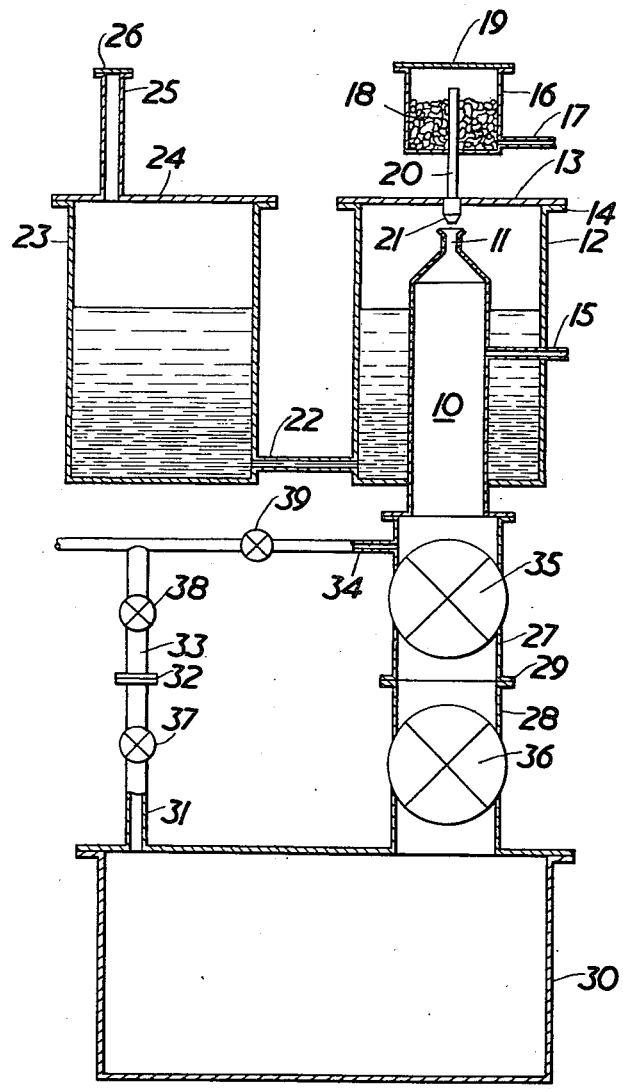

2,772,875
PRODUCTION OF PURE TITANIUM AND ZIRCONIUM

Joseph Peppo Levy, Acton, London, England

Application February 18, 1953, Serial No. 337,475

5 Claims. (Cl. 266—33)

This invention relates to the production of titanium metal in a high state of purity.

Titanium is readily produced in the form of a volatilizable chloride by direct reduction of its ore with carbon in the presence of chlorine, but the production of the pure metal from the chloride is a matter of considerable difficulty owing to the great affinity of the metal for other substances, more particularly for its affinity for both the oxygen and nitrogen of the atmosphere and carbon and hydrogen. Even traces of impurities, particularly oxygen and nitrogen, may render the metal brittle and unworkable and of much less commercial value, although the metal is of great utility when in the pure condition.

Many processes have previously been suggested for obtaining pure titanium from the tetrachloride. Thus, it has been previously suggested to obtain titanium by reacting magnesium with titanium tetrachloride in accordance with the formula $2TMg + TiCl_4 = 2MgCl_2 + Ti$ by introducing the titanium chloride vapour into molten magnesium, titanium being retained in a matrix of unreacted magnesium and magnesium chloride. It is extremely difficult, however, if not impossible, to remove all occluded titanium tetrachloride vapour, and in the subsequent leaching of the mass with water to remove magnesium chloride, this residual tetrachloride vapour is hydrolised, giving insoluble oxides and oxychlorides which cannot be subsequently removed without attacking the titanium itself. Moreover, the leaching itself is a difficult operation to carry to completion and the titanium obtained by this process usually contains at least 1% of impurities, mainly because of the difficulty of leaching the solid matrix. The use of hydrochloric acid may also introduce fresh impurities, since the hydrogen liberated may also act on very finely-divided titanium to form titanium hydride and impurities in the material normally used for lining the chamber may introduce further impurities which contaminate the titanium.

It has now been found that titanium can be produced in a high state of purity without encountering the difficulties above referred to if the reduction reaction is carried out in the vapour phase in the presence of an inert gas (viz. one of the noble gases, in particular argon, helium or neon, on account of their availability) to act as an entrainant and effect the rapid removal and separation of the products of reaction.

It is also essential, in order to avoid contamination by the walls of the reaction vessel of the titanium metal when formed, to arrange for the reaction to take place in a reaction zone surrounded by moving inert gas and to carry away rapidly the reaction products as soon as formed to a cool zone without contact while hot with the walls of the vessel, and also to prevent mist particles of alkaline earth chloride from coalescing.

It will be shown hereinafter that the employment of a vapour phase reaction in conjunction with a moving inert gas entrainant not only avoids the difficulties hitherto encountered in obtaining pure titanium, but also carries with it many advantages which could not have been foreseen.

A process for the production of pure titanium using a metal reducing agent consisting of magnesium containing calcium is described and claimed in my U. S. application Serial No. 302,809, filed August 5, 1952, now abandoned, corresponding to British Patent No. 711,733, according to which the reducing agent is used in the molten or finely-divided solid state. It was found that the addition of calcium to magnesium, even in amounts of 1 percent of calcium, has a marked scavenging or gettering effect on the atmosphere in the reaction vessel, thereby contributing to the purity of the titanium liberated, the alloy preferentially absorbing hydrogen, oxygen, nitrogen and carbon.

Accordingly, in its broadest aspect, the present invention includes the process for the production of pure titanium which comprises reacting titanium tetrachloride in the vapour phase and in the presence of a moving inert gas with the vapour obtained by volatilising magnesium or an alloy of magnesium and calcium, by bringing together the vapours to be reacted in a reaction zone surrounded by the moving inert gas, and collecting the reaction products in a finely-divided form by passing them, while entrained in the inert gas, through a zone sufficiently cool to convert the metal chloride rapidly into solid form before the particles are allowed to settle.

The inert gas employed may conveniently be argon on account of its availability and the employment of an alloy of magnesium and calcium has the further advantage of higher reactivity and lower melting point than magnesium, but the invention will be further described in connection with the use of magnesium as the reducing metal.

The inert gas is preferably employed as a vehicle to carry one or both of the reaction ingredients into the reaction zone and to carry the reaction products rapidly away from the reaction zone. This is important as it enables the products of reaction to be maintained in finely-divided state in suspension until cool enough to be collected as a fine powder and it is this feature of the invention which enables the titanium metal to be separated from the magnesium chloride without the difficulties referred to above. Moreover, the inert gas acts to dilute the reaction ingredients and thereby enables the strongly exothermic reaction to be better controlled. It also sweeps away excess tetrachloride vapour and this is one of the many advantages of the use of a vapour phase reaction in conjunction with the employment of a moving inert gas. The higher temperature of the reaction provides a condition of greatly increased chemical activity. Furthermore, by reducing the tetrachloride with magnesium vapour, the reaction becomes practically quantitative, because at that temperature the products of reaction $Ti + MgCl_2$ are in the solid and liquid phases respectively and can thus be easily carried away by the entraining inert gas. This removal of the reaction products as rapidly as they are formed ensures that the reaction proceeds to completion and all the metal vapour is consumed leaving no residual matrix to be dissolved out as when conducting the reduction in the liquid phase. Furthermore, as will be shown hereinafter, the vapour phase reaction using an entraining gas enables a continuous process in a closed cycle to be carried out.

In carrying out the invention, using the inert gas as a vehicle to carry the magnesium vapour forward, it may be caused to draw the vapour from a pool of boiling metal in a vessel surrounding the reaction vessel by passing it through a venturi and into the reaction vessel to meet a current of titanium tetrachloride vapour. Ideal conditions obtain when the magnesium and titanium tetrachloride are in stoichiometric proportions but a small excess of either reactant can be tolerated and a slight excess of tetrachloride vapour over that required to maintain molar proportions prevents the tetrachloride vapour from striking back and acting on the surface of the pool of boiling magnesium to form on the latter a coating of metallic chloride which would thus impede ebullition of the metal. Any reaction on the molten magnesium moreover makes it necessary to separate and recover the products of such reaction with all the disadvantages hereinbefore mentioned. The inert gas passing through the venturi exerts a valuable pumping action which enables the magnesium vapour to be carried into the reaction vessel very effectively.

The reaction is very exothermic and the radiated heat may be utilised in maintaining the magnesium in a state of ebullition.

The products of the reaction are obtained in this way in the form of a finely-divided powder consisting of magnesium chloride and titanium metal as the result of the inert gas moving the said products to a cool zone in the apparatus and absorbing heat from them.

The deposition of both products of reaction in the form of a powder enables the metal to be extracted without difficulty and upon reaching the collecting vessel where for the first time the reaction products come into contact with the walls of the vessel they are cool enough to remain uncontaminated.

Although argon is a comparatively expensive gas, there is very little used in the process, as the argon upon performing its function may be recirculated by passing through condensers and heat exchangers which cool the gas and remove from it any excess tetrachloride. Thus, only small proportions of gas require to be introduced into the circuit from time to time to make good small losses which may occur.

In view of the necessity for keeping the molten magnesium out of contact with either oxygen or nitrogen of the atmosphere, the magnesium boiler may be fed with molten magnesium from a second heated vessel which is replenished by billets of solid metal. The titanium tetrachloride is pressure-fed from a series of replenished storage tanks and the products of reaction are removed through an argon lock at convenient intervals without stopping the reaction.

The magnesium chloride can be easily removed and recovered from the titanium in a condition which enables it to be economically returned to electrolytic cells for decomposition into metal and chlorine, both of which can be re-used in the process, for example, by the process described in British patent application No. 30,719/52, filed December 3, 1952, corresponding to my co-pending U. S. application Serial No. 395,610, filed December 1, 1953.

One specific method of carrying out the invention in a continuous manner will now be described with reference to the accompanying drawing, which shows diagrammatically a form of reaction vessel with its accompanying melting vessel for supplying molten magnesium or magnesium-calcium alloy.

In the drawing the reaction vessel 10 is in the form of a cylinder, the sides of which at the top converge into the venturi throat 11, the upper part of the reaction vessel 10 being surrounded by concentric vessel 12 provided with a cover 13 which may be secured to the flange 14 by bolts (not shown) or otherwise. The reaction vessel is provided with a side inlet 15 passing through the outer vessel 12. Above the outer vessel 12 is a small box 16 provided with an inlet 17 and cover 19 through the bottom of which passes a tube 20 extending upwardly nearly to the top of the box 16 and downwardly through an aperture in the lid 13 terminating in a nozzle 21 situated centrally above the venturi throat 11. The outer vessel 12 communicates through the tube 22 near the bottom thereof with the bottom part of a melting vessel 23 closed with cover 24 in which is provided an inlet 25 of sufficient width to take billets of magnesium. The inlet 25 is closed with a cover 26. The reaction vessel 10 is flanged at the bottom and attached to the wide cooling vessel 27 which is flanged top and bottom and the bottom flanged at 29 is bolted to the flanged inlet conduit 28 of the receiver 30 which has a narrower flanged outlet 31 bolted at 32 to the conduit 33 leading to an outlet 34 in the side of the cooling vessel 27. By means of the valves 35, 36, 37, 38 and 39, the receiver can be shut off from the rest of the apparatus for the purpose of uncoupling the receiver and changing it without opening it or the apparatus to communication with the outside atmosphere.

In operation the outer vessel 12 and the melting vessel 23 are enclosed in furnaces (not shown) which melts the magnesium metal introduced into the opening 26 and maintains the metal in 23 in a molten condition and that in the outer vessel 12 at the boiling point. The apparatus may be worked as a continuous process in which argon from a suitable storage is pumped into the box 16 at the inlet 17 and passes through a quantity of metallic calcium or other gettering material 18 and enters the outer vessel 12 through the delivery tube 20 and jet 21. The stream of argon emerging from the jet 21 and from thence into the venturi throat 11 sets up a pumping action which draws magnesium vapour from above the magnesium in the vessel 12 and carries it down the reaction vessel 10 where it meets a stream of titanium tetrachloride which enters through the inlet 15. An intense exothermic reaction is set up in the centre part of the reaction vessel 10 forming fine particles of titanium metal and a mist of titanium tetrachloride which is carried downwards and enters the cool zone 27 in the lower part of the apparatus where the magnesium chloride solidifies in powder form and the mixed powders are collected in the receiver 30. Argon containing excess tetrachloride passes out at 34 and enters a system of condensers for the removal of titanium tetrachloride which is passed to a suitable storage and the argon is re-circulated entering the apparatus again at 17. By closing the valves 35, 36, and 37, and opening valve 39, the receiver may be changed periodically by undoing the attachments at 32 and 29, the argon circulation being uninterrupted through the short-circuiting valve 39.

The level of the molten magnesium in the outer vessel 12 is kept constant by addition of magnesium billets through the inlet 25 and the connection 22 enables molten magnesium to flow freely into the outer vessel 12 without the air entering the apparatus.

The following is an example of an experimental batch carried out in an apparatus as above described:

A gas-fired furnace was arranged to pre-melt billets of magnesium in the melting vessel 23 which could conveniently transfer the molten metal at about 850° C. to the boiler 12 heated in a second similar furnace. 10 pounds of metal was contained in the magnesium boiler 12, the surface reaching to just below the venturi throat 11 which has a diameter of ½". The nozzle 21 having a diameter of 7/32" was situated above the venturi at a distance suitable for drawing into the reaction vessel magnesium vapour by the argon which is passed through it. The argon flow rate was 3½ cubic feet per minute and the magnesium evaporation was 8 pounds per hour. The titanium tetrachloride corresponded to the molar proportion of 8 pounds per hour of magnesium. In this way the gas flow was maintained at the optimum value so that sufficient magnesium was drawn in to give practically complete reduction of the titanium tetrachloride during its passage through the reaction zone. Optimum conditions will obviously depend on maintaining the correct adjustment of nozzle diameter, venturi throat diameter, distance of the nozzle above the venturi and rate of argon flow and magnesium evaporation which require previous calculation and trial but it was found that with the apparatus used the evaporation of magnesium metal conducive to the best result may vary between 6 and 18 pounds per hour and the molar proportion of titanium tetrachloride is introduced to correspond to the predetermined rate of magnesium evaporation desired during the course of any given experiment. Under the conditions stated above the product is delivered as a fine discreet powder and its particle size was measured for one experiment which was conducted and found to vary between $1/75000$ of an inch and $1/500$ of an inch.

It was also found that with the dimensions given above, anything under 2 cubic feet per minute of argon gave rise to a solid matrix, and anything about 7 cubic feet per minute tends to give only partial reduction or scatters the product too rapidly in the apparatus to permit of cleansing of the argon.

Notwithstanding the fact that at the increased argon flow rate only a partial reduction is obtained, the reaction product is also of value because under the influence of heat titanium dichloride may be made to yield titanium metal and titanium tetrachloride and the latter may be used for further reduction.

It has been found that an electrostatic or cyclone precipitator interposed in the argon circulating system is very effective in collecting the products of reaction and for the purpose of cleansing the argon from minute dust particles which it entrains.

I claim:

1. Apparatus for the production of pure titanium which comprises an upright reaction vessel, the upper part of which is surrounded by a closed vessel for holding boiling magnesium, said reaction vessel converging at the top above the level of the molten magnesium in the outer vessel in a venturi throat and disposed centrally above the latter, an inlet pipe passing through the cover of the outer vessel and terminating in a nozzle, said inlet pipe being connected to a supply of argon, the said reaction vessel being also provided with an inlet for titanium tetrachloride passing through the sides of the outer vessel and the reaction vessel and terminating within the latter at a point below the venturi throat, the lower part of the reaction vessel opening into a cooling vessel and receiver, the said cooling vessel and the receiver being provided with an outlet for carrying away argon and excess titanium tetrachloride.

2. In apparatus for the reduction of metal chlorides in the vapour phase with a reducing metal in the presence of an inert gas, which apparatus comprises a reaction chamber, the upper part at least of which is surrounded by a closed outer chamber, the said reaction chamber converging at its upper end into a venturi throat and opening at its lower end into a cooling and collecting chamber; an inlet conduit for the inert gas passing through the upper cover of the outer chamber and terminating in a jet nozzle situated centrally above the venturi throat of the reaction vessel; an inlet conduit for metal chloride vapour passing through the side of the outer vessel and entering the reaction vessel at a point below the converging upper end thereof; means for supplying the upper part of the outer vessel with reducing metal vapour, and a conduit connecting the collecting vessel with means for re-circulating the inert gas.

3. Apparatus as claimed in claim 2, wherein at least one cyclone separator is interposed in the inert gas circulating system to collect the products of reaction and cleanse the inert gas from minute dust particles entrained therein.

4. In apparatus for the reduction of metal chlorides in the vapour phase with a reducing metal in the presence of an inert gas, which apparatus comprises a reaction chamber, the upper part at least of which is surrounded by a closed outer chamber, said reaction chamber converging at its upper end into a venturi throat and connected at its lower end with a cooling chamber which in turn is connected to a collecting chamber; an inlet conduit for the inert gas passing through the upper cover of the outer chamber and terminating in a jet nozzle situated centrally above the venturi throat of the reaction vessel; an inlet conduit for metal chloride vapour passing through the side of the outer vessel and entering the reaction vessel at a point below the converging upper end thereof; means for supplying the upper part of the outer vessel with reducing metal vapour, and a conduit connecting the collecting vessel with means for re-circulating the inert gas.

5. Apparatus as claimed in claim 4, wherein flanges are provided for disconnecting the collecting chamber from the cooling chamber and the conduit connecting the collecting chamber with the circulating system for the inert gas, and valves are provided for closing the collecting chamber and by-passing the inert gas while the collecting chamber is being changed.

References Cited in the file of this patent

UNITED STATES PATENTS

| 1,306,568 | Weintraub | June 10, 1919 |
| 2,205,854 | Kroll | June 25, 1940 |
| 2,551,341 | Scheer et al. | May 1, 1951 |
| 2,556,763 | Maddex | June 12, 1951 |
| 2,564,337 | Maddex | Aug. 14, 1951 |
| 2,567,838 | Blue | Sept. 11, 1951 |

FOREIGN PATENTS

| 296,867 | Germany | Mar. 13, 1917 |
| 386,621 | Great Britain | Apr. 13, 1931 |